US008465833B2

(12) United States Patent
Lee et al.

(10) Patent No.: US 8,465,833 B2
(45) Date of Patent: Jun. 18, 2013

(54) FERROCENE/CARBON DIOXIDE RELEASING SYSTEM

(75) Inventors: Kwangyeol Lee, Bellevue, WA (US); Seth Adrian Miller, Englewood, CO (US)

(73) Assignee: Empire Technology Development LLC, Wilmington, DE (US)

( * ) Notice: Subject to any disclaimer, the term of this patent is extended or adjusted under 35 U.S.C. 154(b) by 10 days.

(21) Appl. No.: 13/383,516

(22) PCT Filed: Aug. 30, 2011

(86) PCT No.: PCT/US2011/049718
§ 371 (c)(1), (2), (4) Date: Jan. 11, 2012

(87) PCT Pub. No.: WO2013/032447
PCT Pub. Date: Mar. 7, 2013

(65) Prior Publication Data
US 2013/0052452 A1    Feb. 28, 2013

(51) Int. Cl.
*B32B 5/16* (2006.01)
(52) U.S. Cl.
USPC .............................. 428/323; 428/402.2; 252/2
(58) Field of Classification Search
USPC ..................... 428/328, 402.2; 252/2
See application file for complete search history.

(56) References Cited

U.S. PATENT DOCUMENTS

| | | | |
|---|---|---|---|
| T861043 I4 * | 4/1969 | Gross et al. ...................... 169/57 |
| 3,660,321 A | 5/1972 | Praetzel et al. | |
| 4,017,457 A | 4/1977 | Baron et al. | |
| 4,093,556 A * | 6/1978 | Wojciak ..................... 427/213.34 |
| 4,290,847 A * | 9/1981 | Johnson et al. ............... 376/103 |
| 4,567,214 A | 1/1986 | Ilardo | |
| 5,948,323 A | 9/1999 | McLaughlin et al. | |
| 6,106,946 A * | 8/2000 | Tanaka et al. .............. 428/402.2 |
| 6,217,788 B1 * | 4/2001 | Wucherer et al. .................. 252/5 |
| 6,444,315 B1 * | 9/2002 | Barfurth et al. ............... 428/403 |
| 2006/0073334 A1 * | 4/2006 | Schwantes et al. ......... 428/402.2 |
| 2006/0292404 A1 * | 12/2006 | Harris ........................... 428/920 |
| 2007/0272902 A1 * | 11/2007 | Evans et al. ................... 252/600 |
| 2008/0220255 A1 | 9/2008 | Chen et al. | |
| 2008/0277060 A1 * | 11/2008 | Malofsky et al. ............. 156/332 |
| 2010/0173002 A1 * | 7/2010 | Yulai et al. .................... 424/492 |
| 2010/0285313 A1 * | 11/2010 | Zhang et al. .................. 428/376 |

FOREIGN PATENT DOCUMENTS
JP        6340856 A        12/1994

OTHER PUBLICATIONS

International Search Report and Written Opinion for PCT/US2011/049718 dated Oct. 20, 2011.
ESCH, Environmental Health Criteria for Flame Retardants: A General Introduction, World Health Organization, Geneva (1997) (http://www.inchem.org/documents/ehc/ehc/ehc192.htm) [Printed from Internet Dec. 8, 2011].
Linteris et al., Flame Inhibition by Ferrocene, Carbon Dioxide, and Trifluoromethane Blends: Synergistic and Antagonistic Effects, National Institute of Standards and Technology, Gaithersburg, Maryland, pp. 1-4 [Printed from Internet Dec. 8, 2011].
Linteris et al., Flame Inhibition by Ferrocene, Alone and with $CO_2$ and $CF_3H$, *National Institute of Standards & Technology*, Halon Options Technical Working Conference May 2-4, 2000), pp. 129-140.
Loges et al., Probing cooperative interactions of tailor-made nucleation surfaces and macromolecules: a bioinspired route to hollow micrometer-sized calcium carbonate particles, *Langmuir* (Mar. 28, 2006), 22(7):3073-3080.
Ni et al., Preparation of gel-silica/ammonium polyphosphate core-shell flame retardant and properties of polyurethane composites, *Polymers for Advanced Technologies* (May 11, 2010), 22(12):1824-1831.
Palani et al., Selective enrichment of cysteine-containing peptides using SPDP-functionalized superparamagnetic Fe(3)O(4)@SiO(2) nanoparticles: application to comprehensive proteomic profiling, *J Proteome Res.* (Aug. 2008), 7(8):3591-3596.
Goller et al., Silica encapsulation of liquid PDMS droplets, Colloids and Surfaces A: Physicochemical and Engineering Aspects, vol. 142, Issues 2-3 (Dec. 10, 1998) pp. 281-285.

\* cited by examiner

*Primary Examiner* — James J Seidleck
*Assistant Examiner* — Peter A Salamon
(74) *Attorney, Agent, or Firm* — Pepper Hamilton LLP

(57) ABSTRACT

Microparticles that encapsulate a fire extinguishing agent or combination of fire extinguishing agents, methods for preparing these microcapsules, methods for using such microcapsules, and articles of manufacture including at least one of such microparticles either in a coating or in a matrix that makes up a structural component of the article of manufacture are disclosed.

41 Claims, 1 Drawing Sheet

FERROCENE/CARBON DIOXIDE RELEASING SYSTEM

CLAIM OF PRIORITY

This application is a national phase application under 35 U.S.C. §371 of International Application No. PCT/US2011/049718, filed Aug. 30, 2011, which is incorporated herein by reference in its entirety.

BACKGROUND

The combination of ferrocene ($Fe(C_5H_5)_2$) and carbon dioxide has been shown to be a superb flame retardant. In this combination, the ferrocene appears to quench free radicals that propagate the flames by decomposing into naked iron atoms, and an inert gas such as $CO_2$ enhances this effect by preventing the atomic iron from being trapped by oxygen extending the compositions efficacy.

Free ferrocene is not generally useful as a fire retardant alone, because it has a low melting point of 174° C. and boiling point of 249° C.; and even before melting, ferrocene can sublime to get into the gas phase. Thus, a number of attempts have been made to conjugate ferrocene to a polymer backbone to impart fireretardant properties on the polymer. However, ferrocene interferes with the properties' polymer such as coating ability, rheology, color, etc.; and the cost of synthesizing a ferrocene polymer conjugate increased production costs of such polymers. Moreover, even with minor heating, polymer-based coatings can become contaminated with free ferrocene molecules, and ferrocene can leach out from the system into the environment. In order to avoid these problems, ferrocene molecules need to be released into the gas phase only at fairly high temperatures. A potential solution to this problem is encapsulating ferrocene in a sol-gel matrix.

SUMMARY

This disclosure is not limited to the particular systems, devices and methods described, as these may vary. The terminology used in the description is for the purpose of describing the particular versions or embodiments only, and is not intended to limit the scope.

Various embodiments are directed to microcapsules including an inorganic shell encapsulating a flame extinguishing mixture of at least one iron-containing compound and at least one source of an inert gas. In some embodiments, the inorganic shell may include glass, ceramic, or glass-ceramic. In an embodiment, the at least one iron-containing compound may be ferrocene or a ferrocene derivative. The at least one source of inert gas can be any source for inert gas and, in particular embodiments, may be a carbonate or a hydroxide such as, but not limited to, $MgCO_3$, $CaCO_3$, NaOH, KOH, $Mg(OH)_2$, $Ca(OH)_2$, or a combination thereof. The microcapsule of such embodiments may have a core-shell structure or a core-shell-shell structure.

Other embodiments are directed to a fire resistant material including at least one substrate and at least one microcapsule including an inorganic shell encapsulating a flame extinguishing mixture of at least one iron containing compound and at least one source of an inert gas. In some embodiments, the substrate may be a matrix material, such as, but not limited to, polymers, putties, mastics, or paints, and in certain embodiments, the matrix material may be a coating. In other embodiments, the substrate may be metal, wood, fabric, concrete, particle board, a polymer material, or combination thereof, and the substrate may be coated with a matrix material comprising at least one microcapsule. In still other embodiments, the matrix material may be a shaped article having at least one microcapsule incorporated into the article.

Embodiments also include methods for preparing a microcapsule including the steps of providing at least one iron containing compound, providing at least one source of an inert gas, providing at least one inorganic shell precursor, combining the at least one iron-containing compound, the at least one source of inert gas, and at least one inorganic shell precursor in an aqueous solution to form a suspension, stirring the suspension, maintaining a temperature and pH operable to precipitate the at least one inorganic shell precursor, and isolating the microcapsules from the suspension.

Yet other embodiments are directed to methods for preparing fire resistant material including the steps of providing a substrate, providing at least one microcapsule including an inorganic shell encapsulating a flame extinguishing mixture of at least one iron-containing compound and at least one source of an inert gas, and combining the at least one substrate and the at least one microcapsule, to form a fire resistant material.

DETAILED DESCRIPTION

Figure 1:
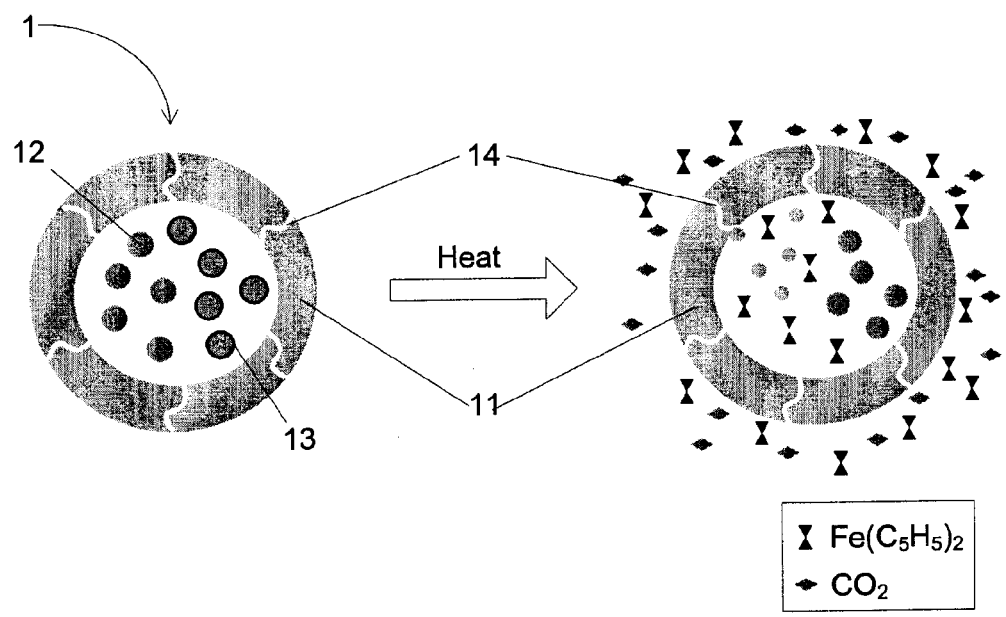
FIG. 1 is a cartoon that illustrates a core-shell microcapsule 1 according to an embodiment. In this exemplary embodiment, a silicon dioxide shell 11 encapsulates $CO_2$ forming infumescent particles 12 and fixed ferrocene particles 13. When heated, ferrocene and $CO_2$ are released from the core through pores 14 in the shell 11.

Various embodiments of the invention are directed to microcapsules including an inorganic shell encapsulating a flame retardant mixture of an iron containing compound and a source of an inert gas, fire resistant materials including a substrate and such microcapsules, and methods for preparing such fire resistant materials. Further embodiments are directed to methods for preparing such microcapsules by combining an iron containing compound with a source of inert gas and inorganic shell precursor in an aqueous solution to form a suspension and stirring the suspension while maintaining a temperature and pH that precipitates the inorganic shell precursor, and isolating microcapsules from the suspension. Without wishing to be bound be theory, encapsulating the iron-containing compound in microcapsules with a source of inert gas such as a $CO_2$-forming intumescent material may prevent the iron-containing compound from subliming out of a material into which the microcapsules are mixed, and the inert gas may enhance the flame retardant activity of the iron-containing compound.

The iron-containing compound may be any iron-containing compound known in the art. In some embodiments, the iron-containing compound may be a volatile iron compound such as, but not limited to, iron pentacarbonyl, iron hexacarbonyl, iron acetylacetonate, ferrocene, ferrocene derivatives, or any combination thereof. In certain embodiments, the iron-containing compound may be a ferrocene or ferrocene derivative, and in particular embodiments, the iron-containing compound may be a ferrocene of general formula I:

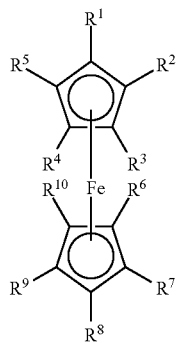

I where each of $R^1$, $R^2$, $R^3$, $R^4$, $R^5$, $R^6$, $R^7$, $R^8$, $R^9$, and $R^{10}$ can independently be H, alkyl, cycloalkyl, aryl, heteroaryl, heterocycle, —COOH, $PR^{11}_2$, and $NR^{11}_2$, where each $R^{11}$ is independently selected from H, alkyl, cycloalkyl, aryl, heteroaryl, heterocycle, and —COOH.

In particular embodiments, the ferrocene may be fixed or immobilized by, for example and without limitation, encapsulation.

The source of inert gas may be any source of inert gas known in the art, and in certain embodiments, the inert gas may be carbon dioxide ($CO_2$) or water vapor. In some embodiments, the source of inert gas may be an intumescent material. Intumescent materials include any compound that increases in volume and decreases in density when exposed to heat. Intumescent materials are well-known in the art and are commonly used as passive fire protection agents. In various embodiments, the source of inert gas may be solid at room temperature. For example, in some embodiments, the source of inert gas may be a carbonate, such as, but not limited to, magnesium carbonate ($MgCO_3$), calcium carbonate ($CaCO_3$), or combinations thereof. In other embodiments, the source of inert gas may be a hydroxide, including metal hydroxides, such as, but not limited to, sodium hydroxide (NaOH), potassium hydroxide (KOH), magnesium hydroxide ($Mg(OH)_2$), calcium hydroxide ($Ca(OH)_2$), or combinations thereof. In certain embodiments, any carbonate or combination of carbonates can be combined with any hydroxide or combination of hydroxides listed above.

In still other embodiments, the source of inert gas may include a fuel source and an oxidizer. In such embodiments, the fuel may be, for example, 5-aminotetrazole or a salt thereof, bitetrazole or salts thereof, diazoaminotetrazole or salts thereof, diazotetrazole dimer or salts thereof, guanidine nitrate, aminoguanidine nitrates, nitroguanidine, 5-nitro-1,2,4-triazol-3-one, triaminoguanidinium, diaminoguanidinium, or combination thereof, and the oxidizer may be an alkali metal nitrate, alkaline earth nitrate, phase stabilized ammonium nitrate, perchlorate, iodate, bromate, or combination thereof. In still other embodiments, the inert gas may be water vapor, carbon dioxide, nitrogen, or combination thereof.

Embodiments are not limited to any particular type of inorganic shell that is applied as a shell around the iron-containing compound and source of inert gas to form a microcapsule. The inorganic shell can be composed of any material or combinations of materials. In certain embodiments, the inorganic shell may be a sol gel material. In some embodiments, the inorganic shell may be glass, ceramic, and glass-ceramic, and in still other embodiments, the inorganic shell may be alumina, zirconia, yttria, silica alumina, mullite, sillimanite, porcelain, polycrystalline materials, or combination thereof. In still other embodiments, the inorganic shell may be vitreous silica, vitreous germania, vitreous boric oxide, titanium silicate, aluminosilicate, alkali silicate, alkaline earth silicate, alkaline earth germinate, alkali borate, borosilicate, alkali aluminosilicate, alkali galliosilicate, soda-lime silicate, alkali borosilicate, phosphate, or combination thereof, and in further embodiments, the inorganic shell may be lithium aluminosilicate, lithium silicate, lithium metasilicate, lithium disilicate, zinc silicate, or combination thereof.

In certain embodiments, the microcapsules may be prepared from a silica sol. Suitable silica sols can be silicon dioxide dispersions based on silica sol, silica gel, pyrogenic silicas, precipitated silicas, or mixtures of these. Silica sols or silicon dioxide sols are colloidal solutions of amorphous silicon dioxide in water. Under particular conditions, the silicon dioxide forms spherical particles that are hydroxylated at the surface having diameters of about 1 nm to about 200 nm and BET surface area of about 15 $m^2/g$ to about 2000 $m^2/g$. The surface of the $SiO_2$ particles generally has a charge that is compensated by a corresponding counterion thereby stabilizing the colloidal solution. Alkali-stabilized colloid solutions may include a small amount of, for example, $Na_2O$, $K_2O$, $Li_2O$, ammonia, organic nitrogen bases, tetraalkyl-ammonium hydroxides or alkali metal or ammonium aluminates and can have a pH of about 7 to about 11.5. Silica sols may also be in a weakly acidic form as semi-stable colloidal solutions, and cationically formulated silica sols including small amount of $Al_2(OH)_5Cl$. In general, the solids concentration of the silica sols can be about 5% to about 60% by weight $SiO_2$.

In general, the thickness of the inorganic shell around the active materials may be constant to reduce the likelihood of premature release of the active agents due to thin and weaker portions of the shell. The thickness of the wall created by the microcapsule may be any thickness known in the art and may vary depending on the material of combinations of materials used to create microcapsule. The skilled artisan can choose an appropriate wall thickness based on the use of the microcapsules. For example, in some embodiments, the microcapsules may have a wall thickness of about 0.10 μm to about 100 μm.

The microcapsules prepared from the materials described above may be of any suitable diameter, and the diameter of the microcapsules may vary depending on the application, for example, in some embodiments, small, micrometer scale, microcapsules may be useful for incorporation into a matrix material that is used for polymer coatings or free standing articles. In other embodiments, the microcapsules may smaller, nanometer scale, or larger. In certain exemplary embodiments, the microcapsules may have a diameter of about 5 nm to about 50,000 nm.

In some embodiments, the microcapsules may have a core-shell structure in which the core includes an admixture of the iron-containing compound and the source of inert gas. This core may be surrounded by the inorganic shell material to create the core-shell microcapsule. A cartoon of a core-shell microcapsule is provided in FIG. 1. In other embodiments, the microcapsules may have a 3-layer, core-shell-shell structure. In such embodiments, a core admixture of the iron-containing compound and the source of inert gas may be surrounded by a first shell that includes an iron-containing compound and a source of inert gas, that can be the same or different than the core admixture. A second shell layer of the inorganic shell material may encapsulate this core and first shell composition to create the core-shell-shell microcapsule. A cartoon of the 3-layer core-shell-shell microcapsule is provided in FIG. 2.

The amount of each of the iron containing compound and the source of inert gas in the microcapsules may vary. For example, in some embodiments, the iron-containing compound and the source of inert gas may be provided in an equimolar (1.0 moles:1.0 moles) ratio. In other embodiments, the iron-containing compound may be provided in a molar excess. For example, the molar ratio of iron-containing compound to source of inert gas may be about 1.5:1.0, about 2.0:1.0, about 2.5:1.0, about 3.0:1.0, about 4.0:1.0, about 5.0:1.0, about 5.0:2.0, about 5.0:3.0, about 5.0:4.0, and so on, or any ratio there between. In still other embodiments, the source of inert gas may be provided in a molar excess. For example, the molar ratio of iron containing compound to source of inert gas may be about 1.0:1.5, about 1.0:2.0, about 1.0:2.5, about 1.0:3.0, about 1.0:4.0, about 1.0:5.0, about 2.0:5.0, about 3.0:5.0, about 4.0:5.0, and so on, or any ratio there between.

In embodiments in which the microcapsules are prepared in the 3-layer core-shell-shell configuration, the core and 1st shell layer may include the same concentrations of the iron-containing compound and source of inert gas such that the composition of the core and 1st shell layer are substantially the same. In some embodiments, concentration of the iron-containing compound and source of inert gas in the core and the 1st shell layer may be different. For example, the core may include equimolar amounts of iron-containing compound and source of inert gas and the 1st shell layer may include a higher concentration of the source of inert gas, or the core may include a higher concentration of iron-containing compound and the 1st shell may include a higher concentration of the source of inert gas. In certain embodiments, the core may be entirely iron-containing compound and the 1st shell may be entirely source for inert gas.

In certain embodiments, the iron-containing compound may be ferrocene or a ferrocene derivative, and the source of inert gas may be magnesium carbonate or calcium carbonate. The magnesium or calcium carbonate provide a source of an inert gas, $CO_2$, and have decomposition temperature (onset from 230° C.-250° C. for $MgCO_3$) similar to the boiling point of ferrocene (249° C.). A rise in temperature above the decomposition temperature of the carbonate should trigger a rapid release of $CO_2$. The increased vapor pressure of the two materials should break the inorganic shell releasing both ferrocene and $CO_2$ onto the fire, and this simultaneous release should maximize the flame retardant activity of the ferrocene. Microparticles of this composition may be of either core-shell or core-shell-shell arrangement, and may be of any size described above. In particular embodiments, the inorganic shell may be a sol-gel matrix of, for example, silicon dioxide ($SiO_2$), which creates a glass shell.

The microcapsules of embodiments described above may be prepared by any method. For example, core-shell structures such as those shown in FIG. 1 can be prepared by combining an iron-containing compound and a source of inert gas with an inorganic shell precursor in a solution. This mixture can be heated to remove the solvent and allow the inorganic shell to form a film that encapsulates the iron-containing compound and source of inert gas. As above, in certain embodiments, the iron-containing compound may be a powdered ferrocene and the source of inert gas may be powdered magnesium carbonate which is combined with silicate and/or silica sol-gel precursor in a solution including 1% sodium dodecyl sulfate (SDS). The microcapsules created may be removed from any remaining solvent and washed with a secondary solvent such as hot cyclohexane to remove residual iron-containing compound, source for inert gas or inorganic precursor.

Figure 2:
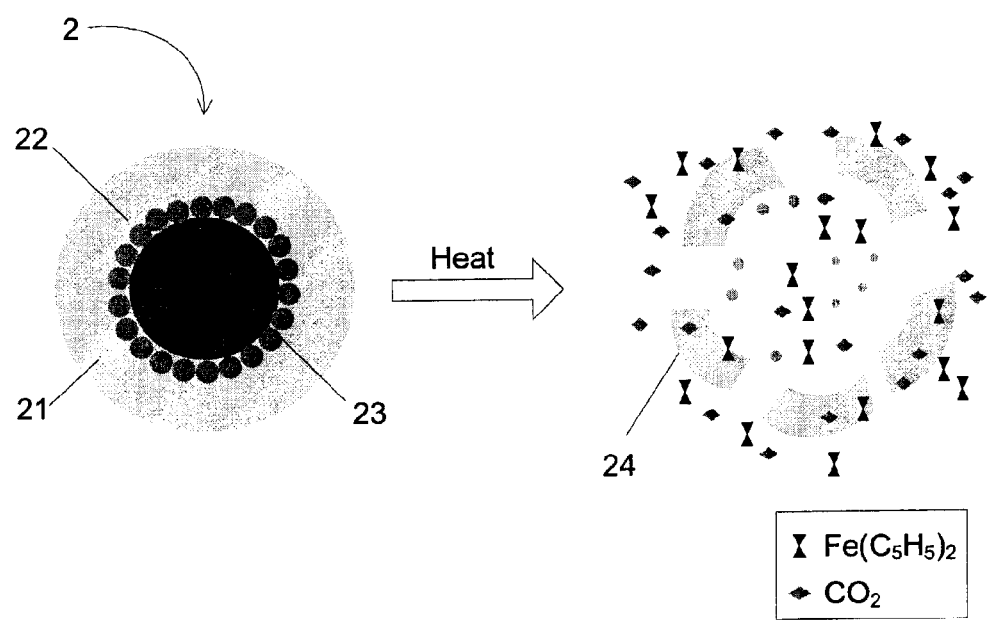
FIG. 2 is a cartoon that illustrates a core-shell-shell microcapsule 2 according to an embodiment. In this exemplary embodiment, a non-porous glass shell 21 covers a secondary shell of $CO_2$ forming infumescent particles 22 and a core of unfixed ferrocene 23. When heated the glass shell bursts as a result of $CO_2$ being released from the $CO_2$ forming infumescent particles 12, releasing the $CO_2$ and ferrocene 23 as well as glass fragments 24.

In another exemplary embodiment, core-shell-shell microcapsules as illustrated in FIG. 2 can be prepared by combining an iron-containing compound with a hallow porous shell of a source of inert gas. For example, powdered ferrocene can be combined with hollow porous magnesium carbonate shells prepared as described in A. Palani et al., Selective Enrichment of Cysteine-Containing Peptides Using SPDP-Functionalized Superparamagnetic $Fe_3O_4*SiO_2$ Nanoparticles: Application to Comprehensive Proteomic Profiling, 7 *J. Proteome Res.* 3591 (2008), and this mixture can be heated to melt the ferrocene. The molten ferrocene enters the interior of the porous magnesium carbonate shell through capillary action. In some embodiments, the heating may be carried out under reduced pressure. The ferrocene-containing magnesium carbonate particles created by this step can then be encapsulated with an insoluble inorganic precursor such as a silicate, for example by exposing the carbonate to a vapor containing tetraethylorthosilicate and water. The resulting microcapsule will have a core-shell-shell structure.

In still other embodiments, an iron containing compound, such as ferrocene, and a source of inert gas, such as stabilized magnesium carbonate micro- or nano-particles, may be entrapped in a sol, which is gelled and powdered. In further embodiments, an iron-containing compound such as ferrocene may be encapsulated to form a first microcapsule and a source of inert gas such as magnesium carbonate can be encapsulated separately to create a second microcapsule. In further embodiments, an iron containing compound such as ferrocene may be fixed to the surface of a micro or nano-particle. The iron containing compound and source of inert gas may be therefore contained in two different core-shell systems, and the separate microcapsules can be combined to provide the flame retardant composition. In these cases, it may be preferred to use a powder of magnesium or calcium carbonate that has been stabilized with a coating of silica, in order to reduce its reactivity in water and its sensitivity to pH changes during the encapsulation process.

Further embodiments are directed to matrix materials including the microcapsules described above and methods for incorporating these microcapsules into the matrix materials. Still further embodiments are directed to coatings and other articles of manufacture that include the microcapsules of various embodiments described above. Without wishing to be bound by theory, matrix materials such as polymers containing the microcapsule described above may be highly fire retardant, and the chemical structure of the coating polymer may be not substantially unchanged allowing the properties of the matrix material to remain unaltered. In some embodiments, the matrix material may be used to create a coating for a substrate; and in other embodiments, the matrix material may be used to create a stand alone-shaped article of manufacture.

The matrix material may be any material into which the microcapsules of the embodiments described above can be added such as, for example, polymers, putties, mastics, and paints. The substrate of various embodiments may be, for example, metal, wood, fabric, concrete, particle board, a polymer material, or combination thereof and can coated with the matrix material including the microcapsules. In certain embodiments, the substrate may be an article of manufacture. In particular embodiments, the polymer matrix material or a polymeric substrate may be polyolefin, polyurea, polyurethane, polyester, polyamide, or combination thereof. The articles of manufacture including the microcapsules of the invention either incorporated into the substrate material or as a matrix material coating a substrate may be any articles of manufacture and, in some embodiments, may be an article of manufacture that is exposed to heat and/or may be susceptible to catching fire. Exemplary articles of manufacture include, but are not limited to, floor surfaces, textiles, fabrics, floor coverings, pillows, stretcher pads, seat coverings, adhesive tapes, garments, wipes, swabs, pens, furniture, conveyor means, delivery trucks, delivery carts, tools, packaging, containers, machine casings, machine covers, electronic components, electronic component carriers, wafer board, wafer jars, batteries, antennae, transistors, printer components, fuel pumps, fuel pump handles, hoses, hose coverings, fuel pump wands, fuel pump nozzles, fuel piping components, vehicle seat upholstery, exterior vehicle paneling, interior vehicle paneling, vehicle console components, gaskets, seals, o-rings, diaphragms, gears, valves, bushings, bumpers, grommets, stoppers, bellows, plugs, vibration mounts, veerings, weather strippings, rollers, tubing connectors, computer casings, circuit boards, through-hole plating of a circuit boards, microprocessors, random access memory components, read only memory components, disc drives, electrodes, or lithographic resists.

Matrix materials that incorporate the microcapsules of various embodiments described above may generally be self extinguishing. Thus, when contacted by a flame, heat produced by the fire will cause the microcapsules incorporated in the matrix material burst releasing ferrocene and carbon dioxide into the fire and extinguishing fire in the immediate vicinity of the microcapsule thereby reducing damage to the matrix material. For example, an article of manufacture composed of a polymer with incorporated microcapsules may be flame and fire resistant, in that upon contact with a flame, heat from the fire will cause the microcapsules to burst extinguishing any fire on the matrix material in the vicinity of the microcapsule. Similarly, a flame resistant paint or putty including the microcapsules described above may reduce fire damage of wood or another substrate onto which the paint or putty is applied. For example, damage to wood that is painted with a paint including the microcapsules will be reduced as a result of bursting of the microcapsules in the paint extinguishing fire and keeping the flames from attacking the wood substrate thereby reducing the structural damage.

EXAMPLES

Example 1

Stabilized Calcium Carbonate in Silica 100 g $CaCO_3$ micro- or nano-particles, such as those obtained by ball milling, are added to a 2 L flask. 500 mL of 1M $Na_2SiO_3$ solution is added into the flask, and the slurry is homogenized by ultrasound for 30 minutes. A 1M HCl solution is dropped into the vessel while stirring at mom temperature and the pH of the solution is titrated to pH=8. The suspension is heated to 80° C. and held there for 2 hours under vigorous stirring. The encapsulated carbonate is filtered and washed with water and acetone, then dried and stored for further use.

Example 2

Ferrocene Encapsulated in Silica 100 g of ferrocene powder is ball milled to reduce its particle size, then charged into a 2 L flask. 500 mL of 1M $Na_2SiO_3$ solution is added into the flask, and the slurry is homogenized by ultrasound for 30 minutes. A 1M HCl solution is dropped into the vessel while stirring at room temperature and the pH of the solution is titrated to pH=8. The suspension is heated to 80° C. and held there for 2 hours under vigorous stirring. The encapsulated ferrocene is filtered and washed with water, acetone, and hexanes, then dried and stored for further use.

Example 3

Ferrocene and Calcium Carbonate Encapsulated in Silica 100 g of ball-milled ferrocene powder and 100 g of stabilized calcium carbonate is charged into a 2 L flask. 500 mL of 1M $Na_2SiO_3$ solution is added into the flask, and the slurry is homogenized by ultrasound for 30 minutes. A 1M HCl solution is dropped into the vessel while stirring at room temperature and the pH of the solution is titrated to pH=8. The suspension is heated to 80° C. and held there for 2 hours under vigorous stirring. The encapsulated ferrocene/carbonate is filtered and washed with water, acetone, and hexanes, then dried and stored for further use.

Example 4

Ferrocene and Magnesium Carbonate Colloidal Silica Microparticles

A one liter baffled reactor can be charged with 525 g of water, 10.0 g of ferrocene ($Fe(C_5H_5)_2$), 5.0 g of magnesium carbonate ($MgCO_3$) and 5.0 g of Cab-O—Sil™ having a mean particle size of 0.007 µm. The pH of this solution can be lowered to 3.5 by the addition of 27% acetic acid, and 190 g of fill solution (23.1 g (12.3%) N,N'-(dioctanoyloxyethyl) dithiooxamide, 29.1 g (15.5%) diethyl phthalate, 43.5 g (23.2%) tributyl phosphate, and 91.9 g (49.0%) cyclohexane) can be added to the solution. After the addition of the fill solution, the mixture can be homogenized until droplets having a mean particle size of 30 µm or less in diameter form. Additional Cab-O—Sil™ silica can be added to reduce the mean particle size.

The reactor can be placed in a water bath set at 50° C., and the mixture can be stirred until the contents of the reactor had equilibrated with the bath temperature. Following equilibration, 28.0 ml of 37% formaldehyde can be added and stirring can be continued for 2 hours while the temperature is lowered to 25° C. 7.00 ml of 28% ammonium hydroxide can then be added to neutralize the slurry and bring the pH to 7.3. Microcapsules formed should be spherical with smooth walls.

Example 5

Ferrocene and Magnesium Carbonate Colloidal Silica Microparticles

A precondensate solution of 100 g of ferrocene ($Fe(C_5H_5)_2$), 50.0 g of magnesium carbonate ($MgCO_3$), and 0.5 g of potassium tetraborate can be prepared in a 1-L reactor equipped with a stirrer and water bath. The mixture can be heated to 70° C. and maintained at that temperature for about 2.5 hours. This reaction mixture can be diluted with about 250 g water and allowed to cool to room temperature and age overnight.

Encapsulation of the precondensate can be carried out by combining 500 g of the precondensate with about 45 g colloidal silica, about 30 g of NaCl, and about 80 g of water in 1-L reactor set to about 20° C. and stirring this mixture. Upon dissolution of the salt, the mixture can continue to be as 200 g of fill solution (10.5% N,N'-(dioctanoyloxyethyl) dithiooxamide, 1.50% N,N'-dibenzyldithiooxamide, 15.62% diethyl phthalate, 23.44% tributyl phosphate, and 49.44% cyclohexane) can be added. After about 5 minutes, 10% HCl can be added over 5 minutes to adjust the pH to about 3.00. After 12 minutes, an additional 10% HCl can be added over 12 minutes to adjust the pH to 1.85. The reaction can be stirred for about 1 hr at 20° C. The reactor temperature can then be raised to 60° C. and maintained at that temperature for 1.75 hours to cure the microcapsules. After curing, the slurry can be neutralized with ammonia to pH 8, cooled to room temperature, filtered through a 500 μm screen and stored.

Example 6

Ferrocene and Magnesium Carbonate Colloidal Zirconium Dioxide Microparticles

A one liter baffled reactor can be charged with 520 g of water, about 10 g of ferrocene ($Fe(C_5H_5)_2$), 5.0 g of magnesium carbonate ($MgCO_3$), and 40.0 g of Zr 50/20 colloidal solution. A homogenizer can be used to make a dispersion. About 190 g of fill solution (9.4 g (5.0%) N,N'-(dioctanoyloxyethyl)dithiooxamide, 7.5 g (4.0%) Pergascript Olive color former, 5.8 g (3.1%) CAO-5 antioxidant, 77.5 g (41.3%) diethyl phthalate, and 87.4 g (46.6%) cyclohexane) can then be added to the mixture and homogenization can be continued for about 10 minutes. The pH can be raised to 3.5 by adding 10% sodium hydroxide solution. The reactor can be placed in a water bath set at 50° C., and stirring can be continued for 2 hours. The temperature can be lowered to 25° C., and 28% ammonium hydroxide solution can be added to neutralize the slurry and bring the pH to 7.0.

Example 7

Ferrocene and Magnesium Carbonate Polyamide Polyterephthalamide Microparticles

Microcapsules can be prepared by dissolving about 35 g of terephthaloyl chloride (TPC) and about 10 g of ferrocene ($Fe(C_5H_5)_2$), 5.0 g of magnesium carbonate ($MgCO_3$) in about 70 g of dibutyl phthalate (DBP) and then emulsifying this mixture with a 2% partially hydrolyzed polyvinyl alcohol 50-42 for about 2 minutes. A mixture of about 20 g of diethylene triamine (DET), about 15 g sodium carbonate and about 90 ml of water can be prepared and then added to the emulsion. The entire mixture can be stirred for about 20 hours when a stable pH of about 7 is obtained. The resultant microcapsules have a core containing ferrocene and $MgCO_3$ dissolved in DBP and encapsulated with polyamide polyterephthalamide.

Example 8

Microparticles/Polycarbonate Mixtures

Microparticles prepared as described in Example 4 can be incorporated into a polycarbonate such as MAKROLON® at various concentrations. MAKROLON® pellets can be melted in a BANBURY® mixer heated to between 130° C. and 150° C., and microparticles can be added to the molten polycarbonate to create polymers having 0.5 wt. %, 1.0 wt. %, 1.5 wt. %, 2.0 wt. %, 2.5 wt. %, and 5.0 wt. % microparticles.

The microparticle/polycarbonate compositions and polycarbonate alone controls can then be injection molded to create test articles of uniform size and thickness. These test articles can be tested for notch impact strength using the Notched Izod Impact Strength ISO 180 procedure and flame resistance using the procedure of Underwriter's Laboratory Bulletin 94 entitled "Tests for Flammability of Plastic Materials, UL94," which is incorporated herein by reference. Briefly, in the UL94 procedure sample articles are mounted to a bar such that the long axis vertical of the test article is 9.5 mm above the Bunsen burner tube. A blue 19 mm high flame is applied to the center of the lower edge of the specimen for 10 seconds. The time until the flaming of the bar ceases is recorded. If burning ceases, the flame is re-applied for an additional 10 seconds. Again, the time until the flaming of the bar ceases is recorded. Specimen drip particles are allowed to fall onto a layer of untreated surgical cotton placed 305 mm below the specimen.

These tests should show that test articles with microparticles at any concentration have improved flame resistance, i.e., flaming of the bar ceases faster than control test articles with no microcapsules. These tests should also show that test articles prepared from polycarbonate with microcapsules at any concentration maintain comparable notched impact strength to polycarbonate test articles of the same size with no microparticles.

Example 9

Microparticle Paint

The following component ingredients can be added to a Cowles mixer in the order shown to make a base intumescent latex paint, with percentages by weight, 21% water, 0.2% scale inhibitor, 0.1% polyacrylate, and 0.05% poly-dimethylsiloxane. After thorough mixing of these ingredients the following can be added under agitation: 4.5% titanium dioxide pigment, 9.0% pentaerythritol, 0.31% hydroethylcellulose, and 0%, 5.0%, 10%, or 20% microcapsules prepared as described in Example 4. After mixing to a fine paste, the following can be added: 0.1% polyacrylate, 0.03% PROXEL GXL, an aqueous mixture containing 1,2-benzisothiazol-3 (2H)-one, sodium hydroxide, and dipropyleneglycol, 0.75% 2,2,4-trimethyl-1,3-pentanediol monoisobutyrate, 22% vinyl acetate copolymer emulsion (54-56% polymer/solids, 44-46% water), 6.71% water, 1.52% glass bubbles, and 0.6% hydrophobically modified ethylene oxide urethane block copolymer in water. This could provide a base intumescent fire retardant latex paints with various concentrations of microcapsule flame retardant.

These base liquid paints can be applied to the surface of Douglas fir tongue and groove decking at a rate of 300 square feet per U.S. gallon in two coats, and the painted decking can dry in a conditioned room at 70° F. and 50% relative humidity until the paints had dried and reached a constant mass. Once dried to constant mass, the decking panels can be tested under the ASTM E84 procedure to determine Flame Spread Ratings. These ratings can be compared to untreated Douglas fir decking panels from the same batch of tongue and groove decking and decking treated with the 0% microcapsule paint.

These tests should show that decking panels that have been painted with the intumescent fire retardant paint are lower flame spread rating and, thus, are less damaged as a result of the flames applied to the test decking than decking panels with either no paint or decking panels that have been painted with a paint that does not include microparticles.

The illustrative embodiments described in the detailed description and claims are not meant to be limiting. Other embodiments may be utilized, and other changes may be made, without departing from the spirit or scope of the subject matter presented herein. It will be readily understood that the aspects of this disclosure, as generally described herein, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrase "at least one" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrase "at least one" and indefinite articles such as "a" or "an" (e.g., "a" and/or "an" should be interpreted to mean "at least one"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art, all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A microcapsule comprising:
  an inorganic shell encapsulating a flame extinguishing mixture comprising:
  at least one iron-containing compound; and
  at least one source of an inert gas.

2. The microcapsule of claim 1, wherein the inorganic shell has a diameter of about 5 μm to about 5000 μm.

3. The microcapsule of claim 1, wherein the inorganic shell has a wall thickness of about 0.10 μm to about 100 μm.

4. The microcapsule of claim 1, wherein the inorganic shell comprises glass, ceramic, glass-ceramic, alumina, zirconia, yttria, silica alumina, mullite, sillimanite, porcelain, polycrystalline materials, vitreous silica, vitreous germania, vitreous boric oxide, titanium silicate, aluminosilicate, alkali silicate, alkaline earth silicate, alkaline earth germinate, alkali borate, borosilicate, alkali aluminosilicate, alkali galliosilicate, soda-lime silicate, alkali borosilicate, phosphate, lithium aluminosilicate, lithium silicate, lithium metasilicate, lithium disilicate, zinc silicate, or combination thereof.

5. The microcapsule of claim 1, wherein the inorganic shell is a sol gel material.

6. The microcapsule of claim 1, wherein the at least one iron-containing compound comprises iron pentacarbonyl, iron hexacarbonyl, iron acetylacetonate, ferrocene, ferrocene derivatives, fixed ferrocene, fixed ferrocene derivative, or combination thereof.

7. The microcapsule of claim 1, wherein the at least one iron-containing compound comprises a ferrocene of formula I:

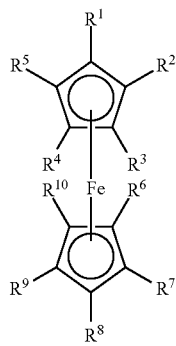

I wherein each of $R^1$, $R^2$, $R^3$, $R^4$, $R^5$, $R^6$, $R^7$, $R^8$, $R^9$, and $R^{10}$ are independently selected from H, alkyl, cycloalkyl, aryl, heteroaryl, heterocycle, —COOH, $PR^{11}_2$, and $NR^{11}_2$, wherein each $R^{11}$ is independently selected from H, alkyl, cycloalkyl, aryl, heteroaryl, heterocycle, and —COOH.

8. The microcapsule of claim 1, wherein the at least one source of inert gas comprises an intumescent compound.

9. The microcapsule of claim 1, wherein the at least one source of inert gas comprises carbonate, hydroxide, water vapor, carbon dioxide, nitrogen, $MgCO_3$, $CaCO_3$, NaOH, KOH, $Mg(OH)_2$, $Ca(OH)_2$, or combination thereof or a fuel and an oxidizer.

10. The microcapsule of claim 9, wherein the fuel comprises 5-aminotetrazole or a salt thereof, bitetrazole or salts thereof, diazoaminotetrazole or salts thereof, diazotetrazole dimer or salts thereof, guanidine nitrate, aminoguanidine nitrates, nitroguanidine, 5-nitro-1,2,4-triazol-3-one, triaminoguanidinium, diaminoguanidinium, or combination thereof, and oxidizer comprises an alkali metal nitrate, alkaline earth nitrate, phase stabilized ammonium nitrate, perchlorate, iodate, bromate, or combination thereof.

11. The microcapsule of claim 1, wherein the microcapsule has a core-shell structure or a core-shell-shell structure.

12. A fire resistant material comprising:
at least one substrate; and
at least one microcapsule comprising an inorganic shell encapsulating a flame extinguishing mixture comprising:
at least one iron containing compound; and
at least one source of an inert gas.

13. The fire resistant material of claim 12, wherein the inorganic shell has a diameter of about 5 μm to about 5000 μm.

14. The fire resistant material of claim 12, wherein the inorganic shell has a wall thickness of about 0.10 μm to about 100 μm.

15. The fire resistant material of claim 12, wherein the inorganic shell comprises glass, ceramic, glass-ceramic, alumina, zirconia, yttria, silica alumina, mullite, sillimanite, porcelain, polycrystalline materials, vitreous silica, vitreous germania, vitreous boric oxide, titanium silicate, aluminosilicate, alkali silicate, alkaline earth silicate, alkaline earth germinate, alkali borate, borosilicate, alkali aluminosilicate, alkali galliosilicate, soda-lime silicate, alkali borosilicate, phosphate, lithium aluminosilicate, lithium silicate, lithium metasilicate, lithium disilicate, zinc silicate, or combination thereof.

16. The fire resistant material of claim 12, wherein the inorganic shell is a sol gel material.

17. The fire resistant material of claim 12, wherein the at least one iron-containing compound comprises iron pentacarbonyl, iron hexacarbonyl, iron acetylacetonate, ferrocene, ferrocene derivatives, fixed ferrocene, fixed ferrocene derivative, or combination thereof.

18. The fire resistant material of claim 12, wherein the at least one iron-containing compound comprises a ferrocene of formula I:

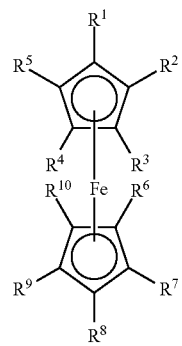

I wherein each of $R^1$, $R^2$, $R^3$, $R^4$, $R^5$, $R^6$, $R^7$, $R^8$, $R^9$, and $R^{10}$ are independently selected from H, alkyl, cycloalkyl, aryl, heteroaryl, heterocycle, —COOH, $PR^{11}_2$, and $NR^{11}_2$, wherein each $R^{11}$ is independently selected from H, alkyl, cycloalkyl, aryl, heteroaryl, heterocycle, and —COOH.

19. The fire resistant material of claim 12, wherein the at least one source of inert gas comprises an intumescent compound.

20. The fire resistant material of claim 12, wherein the at least one source of inert gas comprises carbonate, hydroxide, water vapor, carbon dioxide, nitrogen, $MgCO_3$, $CaCO_3$, NaOH, KOH, $Mg(OH)_2$, $Ca(OH)_2$, or combination thereof or a fuel and an oxidizer.

21. The fire resistant material of claim 20, wherein the fuel comprises 5-aminotetrazole or a salt thereof, bitetrazole or salts thereof, diazoaminotetrazole or salts thereof, diazotetrazole dimer or salts thereof, guanidine nitrate, aminoguanidine nitrates, nitroguanidine, 5-nitro-1,2,4-triazol-3-one, triaminoguanidinium, diaminoguanidinium, or combination thereof, and oxidizer comprises an alkali metal nitrate, alkaline earth nitrate, phase stabilized ammonium nitrate, perchlorate, iodate, bromate, or combination thereof.

22. The microcapsule of claim 1, wherein the microcapsule has a core-shell structure or a core-shell-shell structure.

23. The fire resistant material of claim 12, wherein the substrate comprises polymers, putties, mastics, and paints, coatings, or shaped articles.

24. The fire resistance material of claim 12, wherein the substrate comprises metal, wood, fabric, concrete, particle board, a polymer material, or combination thereof and the substrate is coated with a matrix material comprising at least one microcapsule.

25. The fire resistant material of claim 12, wherein the substrate is an article of manufacture comprising at least one microcapsule.

26. The fire resistant material of claim 25, wherein the at least one microcapsule is provided in a coating comprising a polymer, putty, mastic, or paint.

27. The fire resistant material of claim 25, wherein the article of manufacture comprises a polyolefin, polyurea, polyurethane, polyester, polyamide, or combination thereof.

28. The fire resistant material of claim 25, wherein the article of manufacture comprises a floor surface, textile fabric, floor covering, pillow, stretcher pad, seat covering, adhesive tape, garment, wipe, swab, pen, furniture, conveyor means, delivery truck, delivery cart, tool, packaging, container, machine casing, machine cover, electronic component carrier, wafer boat, wafer jar, battery, antenna, transistor, printer component, fuel pump, fuel pump handle, hose, hose covering, fuel pump wand, fuel pump nozzle, fuel piping component, vehicle seat upholstery, exterior vehicle paneling, interior vehicle paneling, vehicle console component, gasket, seal, o-ring, diaphragm, gear, valve, bushing, bumper, grommet, stopper, bellows, plug, vibration mount, veering, weather stripping, roller, tubing connector, computer casing, circuit board, through-hole plating of a circuit board, microprocessor, random access memory component, read only memory component, disc drive, electrode, or lithographic resist.

29. A method for preparing a microcapsule, the method comprising:
providing at least one iron containing compound;
providing at least one source of an inert gas;
providing at least one inorganic shell precursor;
combining the at least one iron containing compound, the at least one source of inert gas, and at least one inorganic shell precursor in an aqueous solution to form a suspension;
stirring the suspension;
maintaining a temperature and pH operable to precipitate the at least one inorganic shell precursor; and
isolating the microcapsules from the suspension.

30. The method of claim 29, further comprising:
providing a template agent selected from the group consisting of a long-chain alkyl quaternary ammonium salts, surfactants, and combination thereof; and
combining the template agent with the at least one iron containing compound, the at least one source of inert gas, and at least one inorganic shell precursor in an aqueous solution to form a suspension.

31. The method of claim 29, wherein the temperature is about 10° C. to about 200° C.

32. The method of claim 29, wherein the pH is about 5 to about 12.

33. The method of claim 29, wherein the at least one iron-containing compound iron pentacarbonyl, iron hexacarbonyl, iron acetylacetonate, ferrocene, ferrocene derivatives, fixed ferrocene, fixed ferrocene derivative, or combination thereof.

34. The method of claim 29, wherein the at least one source of inert gas comprises carbonate, hydroxide, water vapor, carbon dioxide, nitrogen, $MgCO_3$, $CaCO_3$, NaOH, KOH, $Mg(OH)_2$, $Ca(OH)_2$, or combination thereof or a fuel and an oxidizer.

35. The method of claim 29, wherein the inorganic shell comprises glass, ceramic, glass-ceramic, alumina, zirconia, yttria, silica alumina, mullite, sillimanite, porcelain, polycrystalline materials, yitreous silica, vitreous germania, vitreous boric oxide, titanium silicate, aluminosilicate, alkali silicate, alkaline earth silicate, alkaline earth germinate, alkali borate, borosilicate, alkali aluminosilicate, alkali galliosilicate, soda-lime silicate, alkali borosilicate, phosphate, lithium aluminosilicate, lithium silicate, lithium metasilicate, lithium disilicate, zinc silicate, or combination thereof.

36. A method for preparing fire resistant material, the method comprising:
providing a substrate;
providing at least one microcapsule comprising an inorganic shell encapsulating a flame extinguishing mixture comprising:
at least one iron containing compound; and
at least one source of an inert gas; and
combining the at least one substrate and the at least one microcapsule to form a fire resistant material.

37. The method of claim 36, wherein the inorganic shell comprises glass, ceramic, glass-ceramic, alumina, zirconia, yttria, silica alumina, mullite, sillimanite, porcelain, polycrystalline materials, vitreous silica, vitreous germania, vitreous boric oxide, titanium silicate, aluminosilicate, alkali silicate, alkaline earth silicate, alkaline earth germinate, alkali borate, borosilicate, alkali aluminosilicate, alkali galliosilicate, soda-lime silicate, alkali borosilicate, phosphate, lithium aluminosilicate, lithium silicate, lithium metasilicate, lithium disilicate, zinc silicate, or combination thereof.

38. The method of claim 36, wherein the substrate comprises a polymer, putty, mastic, or paint.

39. The method of claim 36, wherein the at least one iron-containing compound comprises iron pentacarbonyl, iron hexacarbonyl, iron acetylacetonate, ferrocene, ferrocene derivatives, fixed ferrocene, fixed ferrocene derivatives, or combination thereof.

40. The method of claim 36, wherein the at least one source of inert gas comprises carbonate, hydroxide, water vapor, carbon dioxide, nitrogen, $MgCO_3$, $CaCO_3$, NaOH, KOH, $Mg(OH)_2$, $Ca(OH)_2$, or combination thereof or a fuel and an oxidizer.

41. The method of claim 36, wherein combining further comprises at least one of stirring, mixing, melt mixing, shaking, or combination thereof.

* * * * *

UNITED STATES PATENT AND TRADEMARK OFFICE
CERTIFICATE OF CORRECTION

| | | |
|---|---|---|
| PATENT NO. | : 8,465,833 B2 | Page 1 of 1 |
| APPLICATION NO. | : 13/383516 | |
| DATED | : June 18, 2013 | |
| INVENTOR(S) | : Lee et al. | |

It is certified that error appears in the above-identified patent and that said Letters Patent is hereby corrected as shown below:

In the Specification:

In Column 2, Line 21, delete "microcapsule," and insert -- microcapsule --, therefor.

In Column 6, Line 54, delete "stand alone-shaped" and insert -- standalone shaped --, therefor.

In Column 7, Line 55, delete "mom" and insert -- room --, therefor.

In the Claims:

In Column 16, Line 2, in Claim 33, delete "compound" and insert -- compound comprises --, therefor.

In Column 16, Line 13, in Claim 35, delete "yitreous silica," and insert -- vitreous silica, --, therefor.

Signed and Sealed this
Fifteenth Day of October, 2013

Teresa Stanek Rea
*Deputy Director of the United States Patent and Trademark Office*